(12) United States Patent
Sapienza

(10) Patent No.: US 6,315,919 B1
(45) Date of Patent: *Nov. 13, 2001

(54) ENVIRONMENTALLY BENIGN ANTI-ICING OR DEICING FLUIDS

(75) Inventor: Richard Sapienza, Shoreham, NY (US)

(73) Assignee: MLI Associates L.L.C., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/676,377

(22) Filed: Sep. 29, 2000

Related U.S. Application Data

(63) Continuation of application No. 09/436,811, filed on Nov. 9, 1999, now Pat. No. 6,129,857, which is a continuation of application No. 09/161,865, filed on Sep. 28, 1998, now Pat. No. 5,980,774, and a continuation-in-part of application No. 08/940,936, filed on Sep. 10, 1997, now Pat. No. 5,876,621.

(51) Int. Cl.$^7$ .................................................. C09K 3/18
(52) U.S. Cl. ................................................ 252/70; 106/13
(58) Field of Search ............................. 106/13; 252/70

(56) References Cited

U.S. PATENT DOCUMENTS

| | | | |
|---|---|---|---|
| 3,711,409 | 1/1973 | Avres et al. | 252/70 |
| 4,223,129 | 9/1980 | Roth et al. | 536/4 |
| 4,329,449 | 5/1982 | Roth et al. | 536/18.6 |
| 4,448,702 | 5/1984 | Kaes | 252/70 |
| 4,647,392 | 3/1987 | Darden et al. | 252/75 |
| 4,664,832 | 5/1987 | Sandvig et al. | 252/70 |
| 4,676,918 | 6/1987 | Toth et al. | 252/70 |
| 4,746,449 | 5/1988 | Peel | 252/70 |
| 4,960,531 | 10/1990 | Connor et al. | 252/70 |
| 5,238,592 * | 8/1993 | Stankowiak et al. | 252/70 |
| 5,324,442 | 6/1994 | Matthews | 252/70 |
| 5,350,533 | 9/1994 | Hubred et al. | 252/70 |
| 5,376,293 | 12/1994 | Johnston | 252/70 |
| 5,387,358 | 2/1995 | Himmrich et al. | 252/70 |
| 5,387,359 | 2/1995 | Himmrich et al. | 252/70 |
| 5,395,658 | 3/1995 | Jaklin | 427/397.8 |
| 5,435,930 | 7/1995 | Chan et al. | 252/70 |
| 5,484,547 | 1/1996 | Mendoza | 252/73 |
| 5,635,101 | 6/1997 | Janke et al. | 252/70 |
| 5,639,319 | 6/1997 | Daly | 152/45 |
| 5,709,812 | 1/1998 | Janke et al. | 252/70 |
| 5,709,813 | 1/1998 | Janke et al. | 252/70 |
| 5,718,834 | 2/1998 | Pollman et al. | 252/70 |
| 5,819,776 * | 10/1998 | Kephart | 137/1 |
| 5,853,610 | 12/1998 | Kaes . | |
| 5,876,621 | 3/1999 | Sapienza | 252/70 |
| 5,980,774 | 11/1999 | Sapienza | 252/70 |
| 6,080,330 | 6/2000 | Bloomer | 252/70 |
| 6,129,857 | 10/2000 | Sapienza | 252/70 |
| 6,149,834 | 11/2000 | Gall et al. | 252/70 |

FOREIGN PATENT DOCUMENTS

| | | |
|---|---|---|
| 62-201566 | 9/1987 | (JP) . |
| 02-202574 | 8/1990 | (JP) . |
| WO 01/07532 | 2/2001 | (WO) . |

OTHER PUBLICATIONS http:/www.VIGORO.CA/ICE/ingred.html "Common Ice Melter Ingredients"Aug. 30, 1998.

* cited by examiner

*Primary Examiner*—Anthony Green
(74) *Attorney, Agent, or Firm*—Hedman & Costigan, P.C.

(57) ABSTRACT

The present invention provides deicing compositions which are environmentally benign, a process for producing the composition from certain waste process streams, and methods of deicing and/or anti-icing.

38 Claims, No Drawings

ENVIRONMENTALLY BENIGN ANTI-ICING OR DEICING FLUIDS

CROSS REFERENCES TO RELATED APPLICATIONS

This is a continuation of application Ser. No. 09/436,811, filed Nov. 9, 1999, U.S. Pat. No. 6,129,857, issued Oct. 10, 2000, which is itself a continuation of application Ser. No. 09/161,865, filed Sep. 28, 1998, now U.S. Pat. No. 5,980,774, issued Nov. 9, 1999, which in turn is a continuation-in-part of Ser. No. 08/940,936, filed Sep. 30, 1997, now U.S. Pat. No. 5,876,621, issued Mar. 2, 1999.

The present invention relates to a deicing fluid composition. More particularly the present invention relates to a deicing fluid composition which is environmentally benign. Most particularly the present invention relates to an environmentally benign deicing fluid composition which is obtained from various industrial waste streams or from the pure components.

BACKGROUND OF THE INVENTION

Freezing point lowering compositions are in widespread use for a variety of purposes, especially to reduce the freezing point of an aqueous system so that ice cannot be formed or to melt formed ice. Generally, freezing point lowering compositions depend for their effectiveness upon the molar freezing point lowering effect, the number of ionic species which are made available and the degree to which the composition can be dispersed in the liquid phase in which the formation of ice is to be precluded and/or ice is to be melted.

The most pervasive of the commonly used products for deicing are common salt, calcium chloride and urea, with common salt (sodium chloride) being the least expensive and most commonly used. Common salt is widely used to melt ice on road surfaces and the like. In this manner the salt forms a solution with the available liquid in contact with the ice and thereby forms a solution with a lower freezing point than the ice itself so that the ice is melted. Chloride salts however suffer from relatively severe drawbacks, such as the harmful effects on surrounding vegetation by preventing water absorption in the root systems, and its corrosive effects on animal skin such as the feet of animals, clothing, roadways and motor vehicles.

Other inorganic salts are also known to be useful as freezing point lowering agents such as magnesium chloride, potassium phosphates, sodium phosphates, ammonium phosphates, ammonium nitrates, alkaline earth nitrates, magnesium nitrate, ammonium sulfate, alkali sulfates.

Typical of solutions of low freezing points include brines, ethylene glycol and propylene glycol solutions. Brines are used to transfer heat at temperatures below the normal freezing point of water, and the ethylene glycol solutions are well known for use as coolants for automobiles and the like in regions in which the temperature may fall below the normal freezing point of water. Ethylene and propylene glycols are used in relatively large quantities at major airports in northern climates in order to keep air traffic flowing during inclement weather. The fluids are generally applied to the wings, fuselage and tail of aircraft as well as the runways to remove ice. However, these glycol compounds likewise have environmental drawbacks and can be detrimental to sewage treatment processes.

Other prior art deicing fluids such as alcohols have toxic effects and high volatility particularly in the low molecular weight range and may be the cause of offensive smell and fire danger. Furthermore, mono- and polyhydric alcohols oxidize in the presence of atmospheric oxygen to form acids, which can increase corrosion of materials.

Due to the problems associated with deicing agents as described above there have been attempts to prepare even more deicing agents. For, example, Kaes, U.S. Pat. No. 4,448,702 discloses the use of a freezing-point lowering composition and method which calls for the addition of a water soluble salt of at least one dicarboxylic acid having at least three carbon atoms, such as a sodium, potassium, ammonium or organoamine salt of adipic, glutaric, succinic or malonic acid.

Peel, U.S. Pat. No. 4,746,449 teaches the preparation of a deicing agent comprising 12–75% acetate salts, trace-36% carbonate salts, 1–24% formate salts and 1–32% pseudolactate salts which is prepared from a pulp mill black liquor by fractionating the black liquor into a molecular weight fraction and concentrating the collected low molecular weight fraction to produce the deicing agent.

U.S. Pat. No. 4,960,531, teaches that small amounts of methyl glucosides, i.e. less than 10%, can be employed as a trigger to conventional salt deicers.

However, all of these disclosures still require the presence of salts. Accordingly there still exists in the art a need for a deicing and/or anti-icing agent which is environmentally benign and relatively inexpensive to obtain.

SUMMARY OF THE INVENTION

Accordingly the present invention comprises a deicing and/or anti-icing agent which is environmentally benign and can be produced from relatively inexpensive feedstocks. In one embodiment of the present invention the deicing agent comprises a water soluble solution of hydroxycarboxylic acid based esters which are preferably prepared from waste process streams such as from the admixture of components of a pulp mill black liquor with distiller grain solubles and/or whey; the acid treatment of pre-distilled wood, agricultural and/or milk fermentation; the alcoholysis of distiller grain solubles or any combination thereof.

The compositions of the present invention can be applied to a wide variety of surfaces, particularly metallic and non-metallic surfaces of aircraft, which prevents icing, removes frozen water from the surface and prevents its reformation. The invention provides for a deicing composition which can be used on airplanes, runways, bridges, streets and the like. Further, the compositions can be used in heat transfer applications and to applications in which it is vital to maintain a liquid in the unfrozen state, e.g., as in a fire extinguisher. Additionally, the present invention provides for an anti-icing composition which can be applied to a surface, such as bridges, prior to the onset of icing conditions in order to prevent icing from occurring.

The present invention further provides deicing and/or anti-icing agents which are prepared from the pure components, hydroxycarboxylic acid esters, hydrocarbyl aldosides, and or combinations thereof. In one further embodiment of the present invention there is provided a method for deicing and/or anti-icing a surface, the method comprising applying to the surface a composition comprising (a) a deicing and/or anti-icing agent comprising at least about 15 weight percent of a hydrocarbyl aidoside and (b) water. In another further embodiment;, there is provided a deicing and/or anti-icing agent composition comprising (a) a hydroxycarboxylic acid salt, (b) a hydrocarbyl aidoside and (c) water.

DETAILED DESCRIPTION OF THE PRESENT INVENTION

The present invention provides a novel composition useful as a deicing agent and/or an anti-icing agent and a novel method of preparing the deicing and/or anti-icing agents.

The deicing agents of the present invention comprise a hydroxycarboxylic acid ester, a hydrocarbyl aldoside, or both.

Hydroxycarboxylic acid esters are well known to those of ordinary skill in the art and typically comprise hydroxyformate, hydroxyacetate, hydroxypropionate, hydroxybutyrate, hydroxylaurate, hydroxypalmitate, hydroxyoleate, hydroxybenzoate as well as others. Preferred for use in the practice of the present invention are deicing agents comprising a-hydroxypropionate type esters such as alkyl lactates.

Hydrocarbyl aldosides are well known to those of ordinary skill in the art. Preferably the hydrocarbyl aldosides comprise alkyl aldosides arid/or sorbitols.

The alkyl aldosides can be prepared by a continuous alcoholysis process for -making mixed aldoside from polysaccharides, and more particularly, for making mixed alkyl glycosides directly from starch, as described in U.S. Pat. No. 4,223,129. A further process of producing aldosides for use in the practice of the present invention is described in U.S. Pat. No. 4,329,449.

Typical of the alkyl aldosides useful in the practice of the present invention are alpha-methyl glucoside, beta-methyl glucoside, methyl furanosides, methyl maltosides, methyl maltotriosides, mixtures thereof and the like.

In addition to the hydroxycarboxylic acid esters and/or hydrocarbyl aldosides, a wide variety of other components may be included in the deicing and/or anti-icing compositions of the present invention. Along with the free hydroxycarboxylic acid, preferably these include water soluble anionic hydroxycarboxylic acid salts. Generally these components may be added to the deicing and/or anti-icing compositions of the present invention or they are present in or are derived from the process waste streams from which the compositions of the present invention may be obtained.

Also, it is contemplated herein that anionic hydroxycarboxylic acid salts alone or with amino acids and/or water soluble salts of dicarboxylic acids having at least three carbon atoms, preferably selected from adipic, succinic, glutaric and malonic acids may also be included, but are not necessary to the practice of the present invention. These can be added separately such as through the addition of pulp mill black liquors or via alkali additions to hydroxycarboxylic acid containing compositions.

The deicing agents may be prepared from the pure chemical ingredients. For instance, a solution of 25% $H_2O$/10% sodium lactate/65% ethyl lactate was found to have no crystal formation at a temperature of −50° C.

However, it is contemplated by the present invention to obtain the deicing agents of the present invention from any of a number of industrial waste streams which comprise a water soluble solution of hydroxycarboxylic acid, since lactic acid as it occurs in dilute fermentation liquors is inexpensive. The purification of this material is difficult due to its similarity in solubility characteristics to water as the presence of impurities such as dextrins, proteins and unfermented sugars. For instance, the present invention contemplates the use of waste stream selected from the group consisting of a grain stillage, a wood stillage, agricultural or milk fermentation and mixtures of any of the foregoing.

Generally, the components of the present invention are present in or are derived by alcoholysis of the process waste streams. Typically these waste streams include components such as lactic acid fractions and low molecular weight sugars such as sorbitols, maltoses and glucoses.

By subjecting the waste streams to alcoholysis (with an alkyl alcohol) under conditions such as reacting with an alkyl alcohol in the presence of a cation exchange material or other acid, or the addition of an alkyl alcohol to a heated fermentation liquor as taught in Ind. Eng. Chem., 38, pg. 228, 1946 by E. M. Filachione and C. H. Fisher, at least some of the hydroxycarboxylic acids present are converted to the hydroxycarboxylic acid based esters and at least some of the sugars are converted to glucosides, thereby improving the overall acidity of the material. For instance, ethanol treatment of a typical agricultural fermentation waste stream comprising lactic acid and glucose would be partially converted to ethyl lactate and ethyl glucoside. The use of the alcoholysis process aids in increasing the concentration of the glycosides and hydroxycarboxylates, thereby providing an improved product.

For example, components of the present invention can include, but are not limited to: ethyl lactate, glycerol, glycol lactate, ethyl glycinate, ethyl levulinate, ethylenecarbonate, glycerin carbonate, pipecolic acid, tetrahydrofurfuryl acetate, tetrahydrofurfuryl tetrahydrofuroate, sorbitol, glucose glutamate, methyl glucosides, acetais and ketals of glycerol such as 2,2-dimethyl-1,3-dioxolane-4-methanol and salts thereof and the like.

As discussed above, although not critical for the present invention, the compositions of the present invention may further comprise high solubility salts in combination with the hydroxycarboxylates and glucosides. For example, useful salts could include, but are not limited to: hydroxycarboxylic acid salts (including cesium, sodium, potassium, calcium and magnesium salts) such as sodium lactate; acetate salts such as cesium acetate, sodium acetate, potassium acetate; formate salts such as sodium formate; citrate salts such as sodium citrate; amino acids and their salts such as lysine glutamate, sodium pyrrolidone carboxylate and sodium glucoheptonate; dicarboxylic acids salts such as sodium and potassium salts of adipic, glutaric, succinic and malonic acids; lignin components such as lignin sulfonate; boric acid and its salts, glycerin and the like.

Glycols such as propylene glycol, ethylene glycol may also be employed with the compositions of the present invention where desired.

The amount of the acid components, i.e. the hydroxycarboxylic acid esters, hydroxycarboxylic acid salts, lignins and glucosides, which are present in the compositions of the present invention may vary widely and still provide the improved freezing point lowering effect. Preferably, however, the compositions of the present invention comprise a total weight of acid components ranging from about 10 to about 75 weight percent, more preferably from about 20 to about 75 weight percent and most preferably from about 30 to about 75 weight percent, based on the weight of acid and water combined.

The compositions of the present invention are considered non-toxic and readily breakdown, even at low temperatures, in the natural environment without any significant adverse effects. Moreover, the compositions of the present invention are considered to have lower Biological Oxygen Demand (BOD) requirements than comparable de-icers, and a lesser amount of the composition of the present invention (higher water concentration) is required to prevent ice formation at a particular ambient air temperature or quantity of ice. Since the concentration of an anti-icer that is applied should be sufficient to prevent significant ice formation under reasonable conditions much smaller material usage for the composition of the present invention at particular outside air temperatures and precipitate rates results.

In the methods of the present invention, the deicing and/or anti-icing compositions of the present invention are combined with water and applied, such as by spraying, onto the surface desired to be treated. In the case of deicing, the surface already has ice formed thereon, and the deicing compositions of the present invention melt the ice already formed and are further effective in preventing additional ice formation. In the case of anti-icing, upon learning of a weather forecast which predicts possible dangerous icing conditions, the roads and bridges or other surfaces can be pretreated with the anti-icing compositions of the present invention in order to prevent ice formation on the surfaces.

In one embodiment of a method of the present invention where the deicing and/or anti-icing agent includes a hydrocarbyl aldoside without a hydroxycarboxylic acid ester component, the amount of hydrocarbyl aldoside employed to obtain the benefits of the present invention is at least about 15 weight percent based on the weight of the deicing and/or anti-icing agent (not including water) and can comprise up to 100 weight percent. Typically, however the amount of hydrocarbyl aldoside is from about 15 to about 90 weight percent, such as from about 30 to about 90 weight percent, and more particularly from about 50 to about 75 weight percent.

DESCRIPTION OF THE PREFERRED EMBODIMENTS

The following examples are provided for illustrative purposes and are not to be construed to limit the scope of the claims in any manner whatsoever. Unless otherwise indicated, melting points were determined using a Differential Scanning Calorimeter (DSC). Scans were conducted from −160° C. up to 30° C. at 10° C. per minute on a 1 mg sample taken from a 20 g mixture. The complete melt point was utilized.

EXAMPLE 1

A mixture of 25% by weight water, 65% by weight ethyl lactate and 10% by weight sodium lactate was prepared. No crystal formation was observed at a temperature of −50° C.

EXAMPLE 2

A mixture of 50% by weight water and 50% by weight ethyl lactate was prepared. The mixture had a melting point of −18° C.

EXAMPLE 3

A mixture of 70% by weight water, 24% by weight ethyl lactate and 6% by weight sodium lactate was prepared. The mixture had a melting point of −25° C. as determined by DSC and a pH of 6.0. For comparison, a 70% by weight water/30% by weight ethylene glycol solution has a melting point of −18° C.

EXAMPLE 4

The addition of 50% by weight of a 50% mixture of ethyl lactate in water to a concentrated, filtered corn steep liquor (containing 50% water and 50% solids comprising mostly lactic acid and sugars) caused a reduction in freezing point from −11° C. to −16° C. The addition of 2% by weight sodium lactate further reduced the freezing point to −20° C.

EXAMPLE 5

A mixture of 60% by weight water, 20% by weight sodium lactate, 2% by weight proline (an amino acid), 8% by weight sorbitol and 10% by weight sodium pyrrolidone carboxylate (sodium PCA) was prepared. No crystal formation at −35° C. was observed. The pH was 6.57. For comparison a 50% by weight solution propylene glycol has a freezing point of −36° C.

EXAMPLE 6

A mixture of 12% by weight methyl lactate, 44% by weight methyl glucoside and 44% by weight water was prepared. A melting point of −18° C. was observed. The mixture had a pH of 5.

EXAMPLE 7

A mixture containing 35% by weight methyl lactate, 35% by weight methyl glucoside and 30% by weight water has a melting point of −21° C. as determined by DSC.

EXAMPLE 8

A filtered concentrated liquid residue of a 50% mixture of corn stillage and steepwater containing 50% by weight water with a freezing point of −12° C. is heated to 90° C. and treated with 5% ethanol for 8 hours. The resulting mixture has a freezing point of −17° C. The addition of 2% sodium lactate further reduces the freezing point to −21° C.

The above-referenced patents and publications are hereby incorporated by reference.

Many variations of the present invention will suggest themselves to those skilled in the art in light of the above-detailed description. For example, any process stream which contains components from which hydroxycarboxylates can be prepared may be used to prepare the compositions of the present invention. Additionally, a wide variety of lignins, sugars and glucosides may be present in the compositions of the present invention. All such obvious modifications are within the full intended scope of the appended claims.

What is claimed is:

1. A deicing and/or anti-icing agent comprising at least about 10 weight percent based on the weight of (a) and (b) of (a) a hydrocarbyl aldoside selected from the group consisting of furanosides, maltosides, maltotriosides, glucopyranosides and mixtures thereof and (b) water.

2. An agent as defined in claim 1 wherein said hydrocarbyl aldoside comprises a furanoside.

3. An agent as defined in claim 1 wherein said hydrocarbyl aldoside comprises a maltoside.

4. An agent as defined in claim 1 wherein said hydrocarbyl aldoside comprises a maltotrioside.

5. An agent as defined in claim 1 wherein said hydrocarbyl aldoside comprises a glucopyranoside.

6. An agent as defined in claim 1 further comprising a soluble salt.

7. An agent as defined in claim 6 wherein said soluble salt comprises an organic salt selected from the group consisting of a carboxylic acid salt, a dicarboxylic acid salt, a hydroxycarboxylic acid salt and mixtures thereof.

8. An agent as defined in claim 7 wherein said organic salt comprises a hydroxyformate.

9. An agent as defined in claim 7 wherein said organic salt comprises an acetate.

10. An agent as defined in claim 1 further comprising an effective freezing point lowering amount of a freezing point lowering additive selected from the group consisting of amino acids, salts of amino acids, lignin components, boric acid, salts of boric acid, glycerol, glycols and mixtures thereof.

11. An agent as defined in claim 6 further comprising an effective freezing point lowering amount of a freezing point lowering additive selected from the group consisting of amino acids, salts of amino acids, lignin components, boric acid, salts of boric acid, glycerol, glycols and mixtures thereof.

12. A deicing and/or anti-icing agent comprising (a) at least about 10 weight percent based on the weight of (a) and (b) of non-alkyl glucoside in solution with (b) water.

13. An agent as defined in claim 12 further comprising a soluble salt.

14. An agent as defined in claim 13 wherein said soluble salt comprises an organic salt selected from the group consisting of a carboxylic acid salt, a dicarboxylic acid salt, a hydroxycarboxylic acid salt and mixtures thereof.

15. An agent as defined in claim 14 wherein said organic salt comprises a hydroxyformate.

16. An agent as defined in claim 12 further comprising an effective freezing point lowering amount of a freezing point lowering additive selected from the group consisting of amino acids, salts of amino acids, lignin components, boric acid, salts of boric acid, glycerol, glycols and mixtures thereof.

17. An agent as defined in claim 13 further comprising an effective freezing point lowering amount of freezing point lowering additive selected from the group consisting of amino acids, salts of amino acids, lignin components, boric acid, salts of boric acid, glycerol, glycols and mixtures thereof.

18. A deicing and/or anti-icing agent comprising (a) an effective freezing point lowering amount of sorbitol, (b) an effective freezing point lowering amount of a freezing point lowering compound selected from the group consisting of carboxylic acid salts, hydroxycarboxylic acid salts, dicarboxylic acid salts, amino acids, salts of amino acids, lignin components, boric acid, salts of boric acid, glycerol, glycols and mixtures thereof and (c) water.

19. An agent as defined in claim 18 wherein said freezing point lowering compound comprises a hydroxycarboxylic acid salt.

20. An agent as defined in claim 18 wherein said freezing point lowering compound comprises a hydroxyformate.

21. An agent as defined in claim 18 wherein said freezing point lowering compound comprises an acetate.

22. An agent as defined in claim 18 wherein said freezing point lowering compound comprises a dicarboxylic acid salt.

23. A deicing and/or anti-icing agent comprising (a) at least about 10 weight percent based on the weight of (a) and (c) of a hydrocarbyl aldoside; (b) an effective freezing point lowering amount of a freezing point lowering compound selected from the group consisting of carboxylic acid salts, hydroxycarboxylic acid salts, dicarboxylic acid salts, amino acids, salts of amino acids, lignin components, boric acid, salts of boric acid, glycerol, glycols and mixtures thereof and (c) water.

24. An agent as defined in claim 23 wherein said freezing point lowering compound comprises a hydroxycarboxylic acid salt.

25. An agent as defined in claim 23 wherein said freezing point lowering compound comprises a hydroxyformate.

26. An agent as defined in claim 23 wherein said freezing point lowering compound comprises an acetate.

27. An agent as defined in claim 23 wherein said freezing point lowering compound comprises a dicarboxylic acid salt.

28. A method for deicing or anti-icing a surface said method comprising applying to said surface a deicing agent comprising (a) at least about 10 weight percent based on the weight of (a) and (b) of a hydrocarbyl aldoside selected from the group consisting of furanosides, maltosides, maltotriosides, glucopyranosides and mixtures thereof and (b) water.

29. A method for de-icing or anti-icing a surface said method comprising applying to said surface a deicing agent comprising (a) an effective freezing point lowering amount of sorbitol; (b) an effective freezing point lowering amount of a freezing point lowering compound selected from the group consisting of carboxylic acid salts, hydroxycarboxylic acid salts, dicarboxylic acid salts, amino acids, salts of amino acids, lignin components, boric acid, salts of boric acid, glycerol, glycols and mixtures thereof and (c) water.

30. A method for de-icing and anti-icing a surface said method comprising applying to said surface a deicing agent comprising (a) at least about 10 weight percent based on the weight of (a) and (c) of a hydrocarbyl aldoside; (b) an effective freezing point lowering amount of a freezing point lowering compound selected from the group consisting of carboxylic acid salts, hydroxycarboxylic acid salts, dicarboxylic acid salts, amino acids, salts of amino acids, lignin components, boric acid, salts of boric acid, glycerol, glycols and mixtures thereof and (c) water.

31. A deicing and/or anti-icing agent comprising (a) an industrial process stream comprising at least about 10 weight percent of a hydrocarbyl aldoside selected from the group consisting of furanosides, maltosides, maltotriosides, glucopyranosides, non-alkyl glucosides and mixtures thereof, and (b) a soluble salt.

32. A deicing and/or anti-icing agent as defined in claim 31 wherein said industrial process stream further comprises a hydroxycarboxylic acid, or a salt of hydroxycarboxylic acid.

33. A deicing and/or anti-icing agent as defined in claim 32 wherein said industrial process stream comprises lactic acid.

34. A deicing and/or anti-icing agent as defined in claim 31 wherein the industrial process stream is an agricultural process stream comprising at least about 10 weight percent of a hydrocarbyl aldoside selected from the group consisting of furanosides, maltosides, maltotriosides, glucopyranosides, non-alkyl glucosides and mixtures thereof.

35. A deicing and/or anti-icing agent as defined in claim 32 wherein the hydroxycarboxylic acid comprises hydroxyacetic acid or hydroxypropionic acid.

36. A deicing and/or anti-icing agent as defined in claim 32 wherein the aldoside comprises a glucopyranoside, a furanoside or a mixture thereof.

37. An agent as defined in claim 32 wherein said industrial process stream further comprises amino acids, salts of amino acids and/or monosaccharide sugars.

38. A method for deicing or anti-icing a surface said method comprising applying to said surface a deicing or anti-icing solution comprising (a) at least about 10 weight percent based on the weight of (a) and (b) of a hydrocarbyl aldoside selected from the group consisting of non-alkyl glucosides and (b) water.

* * * * *